(12) United States Patent
Rührnschopf

(10) Patent No.: US 7,379,575 B2
(45) Date of Patent: May 27, 2008

(54) METHOD FOR POST- RECONSTRUCTIVE CORRECTION OF IMAGES OF A COMPUTER TOMOGRAPH

(75) Inventor: Ernst-Peter Rührnschopf, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 458 days.

(21) Appl. No.: 11/120,595

(22) Filed: May 3, 2005

(65) Prior Publication Data

US 2005/0249431 A1    Nov. 10, 2005

(30) Foreign Application Priority Data

May 6, 2004    (DE) .................. 10 2004 022 332

(51) Int. Cl.
*G06K 9/00*    (2006.01)
(52) U.S. Cl. ..................... 382/128; 128/922; 378/4
(58) Field of Classification Search ............. 382/100, 382/128, 131, 132, 130, 154, 254, 275; 128/922; 378/4–27
See application file for complete search history.

(56) References Cited

U.S. PATENT DOCUMENTS

| | | | | |
|---|---|---|---|---|
| 4,714,997 A * | 12/1987 | Crawford et al. | ............ | 600/425 |
| 4,870,692 A * | 9/1989 | Zuiderveld et al. | ......... | 382/107 |
| 5,696,848 A * | 12/1997 | Patti et al. | ................... | 382/254 |
| 6,678,399 B2 * | 1/2004 | Doi et al. | .................... | 382/131 |
| 7,046,401 B2 * | 5/2006 | Dufaux et al. | .............. | 358/450 |
| 2002/0097830 A1 | 7/2002 | Raupach | | |
| 2002/0106051 A1 * | 8/2002 | Menhardt | ...................... | 378/4 |
| 2004/0264627 A1 * | 12/2004 | Besson | ........................... | 378/5 |
| 2005/0123089 A1 * | 6/2005 | Man | ............................... | 378/4 |
| 2005/0147320 A1 * | 7/2005 | Hsieh et al. | ................. | 382/275 |
| 2006/0013459 A1 * | 1/2006 | Katscher et al. | ............ | 382/131 |
| 2006/0227928 A1 * | 10/2006 | Timmer | ......................... | 378/4 |
| 2007/0217568 A1 * | 9/2007 | Edic et al. | ...................... | 378/4 |

FOREIGN PATENT DOCUMENTS

DE      34 20 575 C2    9/1998
DE      100 51 462 A1   4/2002

OTHER PUBLICATIONS

R. Ning et al., "X-Ray Scatter Suppression Algorithm for Cone Beam Volume CT", Proceedings of SPIE 2002, pp. 774-781, vol. 4682.
J. Hsieh et al., "An Iterative approach to the beam hardening correction in cone beam CT", Medical Physics, Jan. 2000, pp. 23-29, vol. 27, No. 1.
P.M. Joseph et al., "A Method for Correcting Bone Induced Artifacts in Computed Tomography Scanners", Journal of Computer Assisted Tomography, Jan. 1978, pp. 100-108, Raven Press, New York.

* cited by examiner

*Primary Examiner*—Bhavesh M. Mehta
*Assistant Examiner*—Anand Bhatnagar

(57) ABSTRACT

The present invention relates to a method for correction of images recorded by a computer tomograph in which, from projection data of the computer tomograph a 2D or 3D image is reconstructed and the image is corrected by adding it to a correction image. The outstanding feature of the method is that the correction image is computed from image data of the image reduced in its resolution and number and/or from projection data reduced in its resolution and number. The present method allows the computation of the correction image to be reduced to a fraction of the computation requirements for the standard reconstruction of the 2D or 3D images.

8 Claims, 5 Drawing Sheets

METHOD FOR POST- RECONSTRUCTIVE CORRECTION OF IMAGES OF A COMPUTER TOMOGRAPH

CROSS REFERENCE TO RELATED APPLICATIONS

This application claims priority to the German application No. 10 2004 022 332.7, filed May 6, 2004 which is incorporated by reference herein in its entirety.

FIELD OF INVENTION

The present invention relates to a method for correction of images of a computer tomograph in which a 2D or 3D image is reconstructed from projection data of the computer tomograph and the image is corrected by being added to a correction image.

BACKGROUND OF INVENTION x-ray computer tomography is a specific layer recording method in which transversal cross-sectional images or a 3D volume image of the object area under examination are obtained. In this method the images represent the distribution of the linear attenuation coefficient for x-rays within an object area under examination and thereby a tissue density distribution within this area. The 2D or 3D images must be reconstructed in computer tomography from a large number of different projections. For this there are different reconstruction algorithms known for different beam geometries of the x-rays, for example the filtered back projection with 2D-parallel or fan beam geometry, specific algorithms for spiral computer tomography, approximative Feldkamp algorithm and generalizations thereof as well as exact reconstruction algorithms for 3D cone beam CT. With computer tomography 2D and 3D images from inside the body can be created with high spatial resolution of $\leq 1$ mm and greater quantitative accuracy of the density resolution, typically in the range of a few Hounsfield Units (HU). The reconstruction algorithms used are all based however on idealized physical requirements in respect of the raw data or projection data recorded by the CT measurement system. In practice however, as a result of x-ray scattering and the effect of beam hardening, deviations from this ideal behavior occur which give rise to image artifacts in the reconstructed images. Examples of this are bar artifacts or shadow artifacts in the soft tissue between heavily-absorbent structures such as bones or metal implants. These artifacts in some circumstances adversely effect the quantitative accuracy and can thus lead to incorrect diagnoses.

To reduce or avoid these artifacts the application of post-reconstructive correction methods to the reconstructed image data is known. These correction methods only begin after image data has been reconstructed from the project data under idealized conditions. A significant procedural step with this correction method is the physical reprojection, also known as forward projection. With this reprojection the physical measurement method for obtaining radiographic projections is computationally remodeled in that each measurement beam, starting from the x-ray source, is followed through the object which has been approximated and discretized, i.e. broken down into pixels or voxels, through to the image detector and the contributions in the pixels or voxels lying along the way are summed to form the CT projection measured value. The reprojection differs here depending on the desired correction. Thus the reprojection to correct the beam hardening is performed with a different reprojection method based on another theoretical model for the underlying physical effect than the method for correcting x-ray scattering. Reprojection is thus the algorithmic implementation of a mathematical model for a physical effect. Physical reprojection allows the difference between idealized projection data without the physical disturbance effect, and real projection data to be computed. A correction image is then reconstructed from this difference data, through which, with an addition to the 2D or 3D image reconstructed under idealized conditions, a corrected image without the disturbing image artifacts is obtained. The correction cycle consisting of reprojection, difference formation and reconstruction to obtain a correction image can if necessary be repeated iteratively.

SUMMARY OF INVENTION

However, as a rule, a correction cycle requires a greater effort than the standard reconstruction. Not only is a new reconstruction necessary, but also a physical reprojection, which, as the converse of the back projection mostly used in the standard reconstruction, requires at least the same computing effort as this back projection. As a consequence at least double the effort required for standard reconstruction is necessary for each correction cycle. There is thus a great need for efficient, post-reconstructive correction methods for which the required computation time should only be a fraction of the time required for standard reconstruction.

A series of publications deals with the different correction approaches for correction of beam hardening, for example P. M. Joseph et al., "A Method for Correcting Bone Induced Artifacts in Computed Tomography Scanners", J. Comp. Assist. Tomogr., January 1978, Vol. 2, 100 through 108 In J. Hsieh et al., "An iterative approach to the beam hardening correction in cone beam CT", Med. Phys. 27 (1), January 2000, 23 through 29, a method for correction of beam hardening in computer tomography with conical beams is described, in which through a simplification of the projection geometry for the reprojection the computing effort is reduced.

For correction of x-ray scatter, a method is proposed in R. Ning et al., "x-ray scatter suppression algorithm for cone beam volume CT", Proc., Vol. 4682, 2002, 774-781, in which the x-ray scatter of the relevant CT system is determined on the basis of additional dimensions with what is known as the beam-stop method, to correct the later CT images. To execute this method however, a device is needed with which a beam stop carrier plate near to the patient can be moved into the ray path between x-ray source and patient. To keep the additional beam load as low as possible, the measurements are limited to a number of projection directions. The additionally required measurement procedure is however disruptive to the normal clinical work flow.

An arrangement is known from DE 34 20 575 C2 for reducing the processing time for systems featuring a reproduction device which reproduces initial image data to use reprojections for use in the correction of polychromatic artifacts in diagnostic, medical image representations of an object. With this arrangement the original volume of initial image data is reduced for the correction to speed up the correction processes of the image processor. For this purpose a reduction device is provided which reduces the number of reprojections by measures such as for example a pixel selection or the averaging of a specific number of pixels. With the arrangement in this publication the reconstructed image is not corrected by addition to a correction image. Instead the correction is undertaken on the projection data side.

DE 100 51 462 A1 discloses a method for beam hardening correction for an initial image taken by means of a CT device in which data also reduced in the volume of data of the initial image is included for the correction. The volume of data is reduced by a comparison in which, for the projection, for each of the projection angles, the pixels of the initial image are compared with a threshold value and only those pixels of the initial image which lie above the threshold value are included in the reprojection. This method makes use of the fact that for the evaluation of the attenuation contributions by hardening materials only the pixels above the threshold value, which is definitive for the respective material, are relevant. This publication also does not disclose the correction of the initial image with a correction image, but merely already indicates a correction on the basis of the projection data.

An object of the present invention is to specify a method for correction of images recorded by a computer tomograph which can be performed with reduced computing effort and greater accuracy at the same time.

The object is achieved by the claims. Advantageous embodiments of the method are the subject of the dependent claims or can be taken from the following description as well as the exemplary embodiments.

With the present method for correction of images of a computer tomograph a 2D or 3D image is reconstructed from projection data of an image or of a series of images and the image is additionally corrected by addition to a correction image. The correction image is computed with the present method from image data of the reconstructed image reduced in its resolution and number and/or computed from projection data of the image or image sequence reduced in its resolution and number. The projection data in this case is taken to mean the raw data which is obtained from the individual detector channels of the computer tomographs after a corresponding digitization and where necessary pre-processing. The projection data is thus the data which is available for a subsequent reconstruction of the 2D or 3D image. This data corresponds to the resolution obtained from the recording or recording sequence, both of the spatial resolution and also the density resolution, i.e. the graduations in the range of values obtained during digitization.

A significant feature of the present method now comprises, for the computation of the correction image which can be undertaken with the known correction algorithms in accordance with the prior art, not including the entire projection data or image data present after the reconstruction of the relevant image. Instead the volume of this data is first reduced by reducing the spatial and/or density resolution. The correction image is then computed with this reduced data volume or resolution in a known way. Subsequently the number of pixels or voxels of the correction image is matched once more to the reconstructed 2D or 3D image, using interpolation and up-sampling for example and the correction is undertaken by adding the correction image and the reconstructed 2D or 3D image.

This means that with the method described here the corrected image is generated in a multi-level process. At the top level a standard reconstruction is undertaken with all available projection data, i.e. with the full spatial resolution and the full density resolution. At the lower level the correction image is computed. At this lower level the system works with a reduced resolution and thereby with a significantly lower volume of data. A major reduction in computing time is achieved by this reduced volume of data since the reduced volume of data affects both the reprojection and also the reconstruction when the correction image is computed. Since the correction is frequently an iterative process in which the reprojection and reconstruction steps are executed a number of times, the method gives even greater savings in computing time compared to known methods. This allows the computation of the correction image to be reduced to a fraction of the computation requirements for the standard reconstruction of the 2D or 3D images. The accuracy of the correction can be controlled by the degree of reduction in the computing effort.

The method has the further advantage of being able to be used with different known correction algorithms which begin after the standard reconstruction and are based on computational emulation of physical disturbance effects by using reprojection algorithms. However this must involve disturbance effects which act as largely low-frequency disturbances in the reconstruction. This relates above all to the known disturbance effects of spectral hardening and x-ray scattering.

Different techniques can be used for reduction of the image or projection data volume for computing the correction image. Examples are decimation, down sampling or binning.

With the method discussed here, in which the image data is obtained by only accepting every nth pixels or voxel or the projection data is obtained by accepting only every nth detector channel or every nth projection, an increase in the accuracy in an iterative correction process is achieved in that different image or projection data of the same resolution is used for each Iteration compared to that used for the preceding iteration in each case. This can for example be the projection data of the adjacent projection in each case, of the adjacent detector channels in each case or the image data of the adjacent pixels or voxels in each case. In this way the information of this additional projection or image data is also used to calculate the correction image, so that the accuracy of the correction can be improved without increasing the computing time.

For the reconstruction and image presentation a distinction can be made between two representation scales. The spatial scale, which on the image side includes the pixels and voxels and on the sampling side the sampling scale or sampling, and the value scale which corresponds to the density or gray value scale. With the present method the data reduction can be performed in both scales, i.e. within the framework of a reduction of the spatial resolution on the one hand and of the density or low-contrast resolution on the other.

A reduction of the density resolution for the correction does not lead to a more inaccurate correction for the following reasons. The sampling of the data acquisition and the standard reconstruction are as a rule arranged for computer tomography systems such that the inaccuracy of the reconstruction with error-free projection data only amounts to a few HU and is thus at least two to three orders of magnitude smaller than the overall range of values to be displayed. Experience has shown however that the disturbance effect of the beam hardening lies in the range $\leq 10\%$. Performing beam hardening correction with full density resolution is thus higher by an order or magnitude than is necessary. The reduction of the resolution proposed with the present method is thus justified. This also applies correspondingly for disturbance effects caused by x-ray scattering.

Furthermore with computer tomography imaging it can be established that the disturbance effects observed have a relatively low spatial frequency. Because of the physics of the generally numerous scattering processes to which the x-ray photons are subjected when passing through the volume to be imaged, spatial fine structures are only reproduced very greatly smudged by the distribution of the x-ray scattering. The spatial Fourier spectrum of the x-ray scattering is thus very low frequency so that the x-ray scattering effects can also be corrected with projection or image data of a reduced resolution if the sampling is reduced by a multiple in each dimension. This is shown by the following estimation. The requirements for sampling within each individual projection on the one hand and for the number of projection directions on the other hand as a function of the frequency band of the data are known from the theory of CT image reconstruction. In this case the object area to be reconstructed might have a lateral extension A corresponding to the CT measurement field. The local frequency spectrum might include the maximum bandwidth B (pairs of lines per cm). In accordance with the sampling theory an error-free reconstruction of the object area requires a sampling interval of a $\leq 1/(2B)$. Within a CT-projection then at least $M=A/a \geq 2BA$ sampling values are required in a detector line. The following rules apply to the number of projection directions $N=cM$, where c lies between $\Pi/2$ and $\Pi$ depending on sampling variant and recording geometry. The computing effort for reconstruction and reprojection is proportional to N and dependent quadratically (for 2D-images) or cubically (for 3D images) on M if the pixel or voxel size to be used for the image or volume representation is matched to the sampling interval a. This means that overall there is a greater potential for the computing effort to depend on the frequency band B or the sampling interval a. This shown the enormous potential for savings through a reduction of the spatial resolution when the correction image is computed.

With beam hardening too investigations have shown that the hardening artifacts in CT images are spatially relatively low-frequency compared to the original object structures. Thus a reduction in the resolution also produces a not inconsiderable potential for savings with beam hardening correction as well.

A particular advantage of the present method lies in the fact that correction modules already present in computer tomography systems, especially for x-ray scattering and/or beam hardening correction, do not have to be changed. Instead these correction modules are operated in accordance with the present method merely with a reduced volume of data corresponding to the reduced resolution. In this case varying the reduction in resolution can also be used to initially determine the optimum between the reduction in computing time used and the accuracy of the correction.

BRIEF DESCRIPTION OF THE DRAWINGS

The present method is explained in more detail again below with reference to an exemplary embodiment in connection with the drawings. The drawings show.

DETAILED DESCRIPTION OF INVENTION

Figure 1:
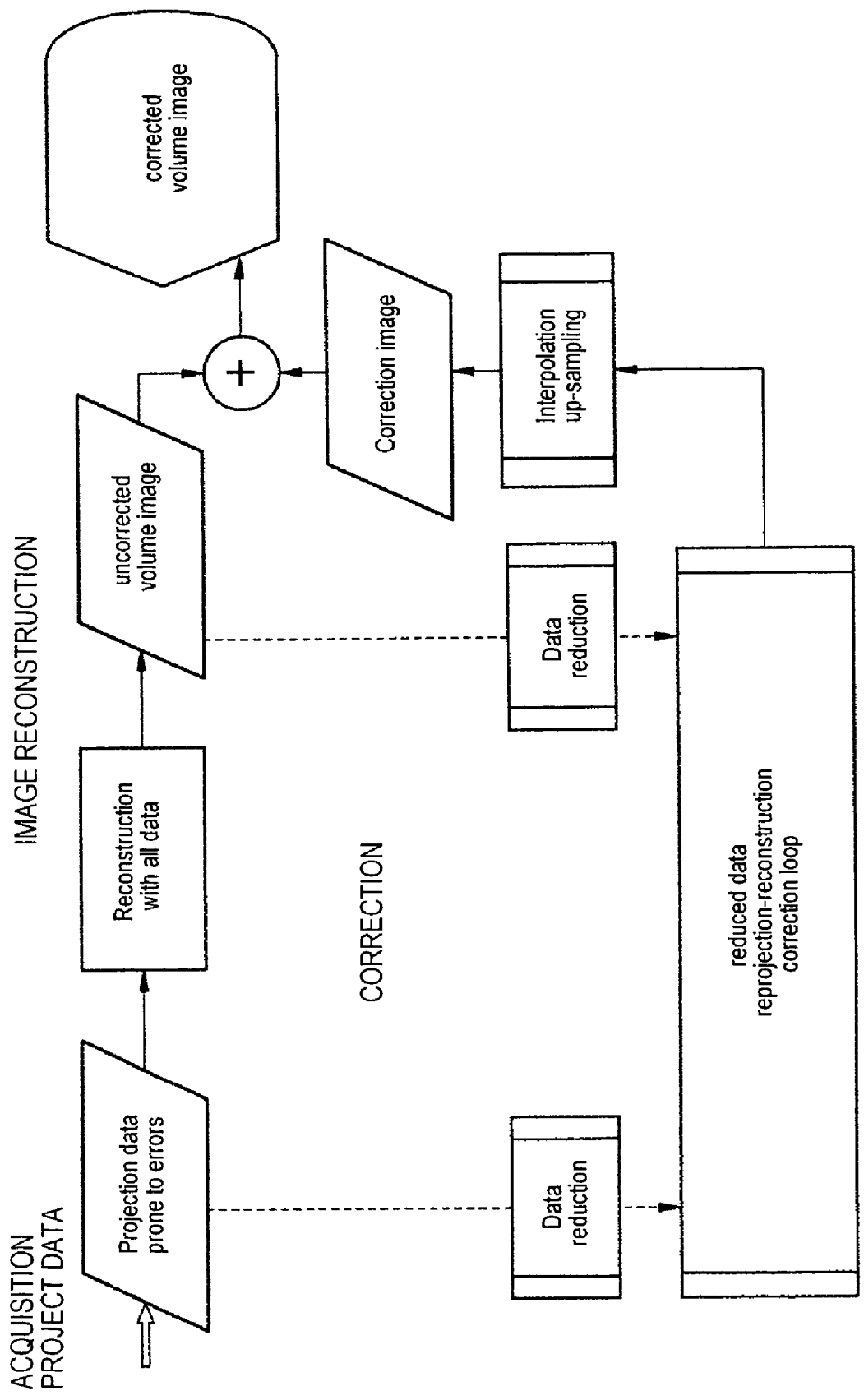
FIG. 1 a schematic overview of the individual steps for executing the present method.

FIG. 1 shows an example of the basic flowchart for executing the present method. This example is shown independent of specific correction methods, with, for the computation of the correction image in the reprojection-reconstruction correction loop, the procedural steps illustrated in greater detail in the subsequent exemplary embodiment being able to be executed.

The inventive method shown in FIG. 1 can be subdivided into four main levels of processing. First the projection data for the generally many hundred projection directions is recorded with the computer tomograph, preprocessed and fed to standard image reconstruction. This standard image reconstruction generally employs the technology of filtered back projection to obtain a reconstructed 2D sectional image or 3D volume image. Because of the presence of disturbance effects, which for example can be caused by spectral hardening or x-ray scattering, the reconstructed image is still imprecise and affected by artifacts.

There now follows the decisive step of the present method, the data reduction on transition to the processing block for post-reconstructive correction. The options for data reduction, such as decimation, down sampling or binning, are explained in greater detail further on in this document. In this case both a reduction of the projection data and also a reduction of the existing image or volume data of the reconstructed image can be undertaken, as indicated by the dashed lines in FIG. 1.

The post-reconstructive correction block, which includes a reprojection-reconstruction-correction loop therefore operates with reduced data, i.e. with data of a more approximate resolution scale. After the computation of the correction image in the general iterative correction cycle in the correction block which was undertaken in the reduced resolution scale, the computed 2D or 3D correction image is brought back by interpolation or up sampling to the original scale of representation of the standard reconstruction and overlaid additively on the uncorrected image of the standard reconstruction as the final correction. A corrected 2D sectional image or 3D volume image is obtained as a result.

Figure 2:
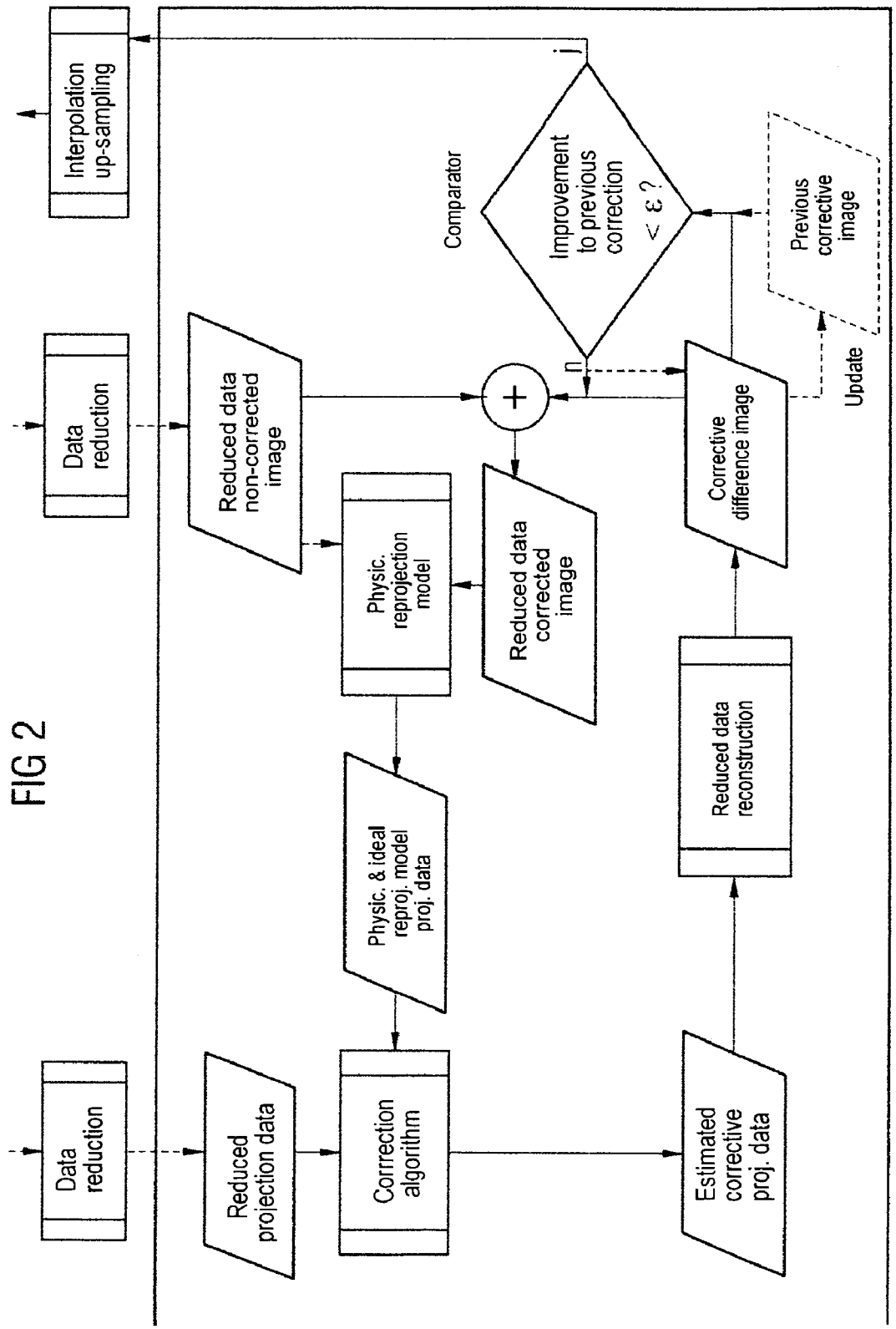
FIG. 2 a first example for an iteration process for computing a correction image.

The post-reconstructive correction block of FIG. 1 comprises in the present example a number of processing steps, as shown in greater detail in FIG. 2. In the first step there is a physical reprojection from the reduced image data provided based on a model for the physical disturbance effect to be corrected. By comparing the physical, ideal projection data from the reproduction model and the reduced projection data from the measurement correction corrected projection data is then computed. From this corrected projection data which is also present in the reduced resolution a corrected image is reconstructed in the next step and which corresponds to a difference image between a disturbance-free and a disturbance-affected image.

Using a comparator an evaluation of the corrected image is performed and a decision is made about continuing or ending the correction. The correction block and a can be run in this case iteratively until such time as an abort criterion is reached. This type of abort criterion can for example be present if, by comparison with the previous correction cycle, there are only very slight changes in the corrected image. The image data of the corrected image which is present after this correction cycle has ended is subsequently fed to the interpolation and up-sampling unit, as has already been explained in connection with FIG. 1.

If the abort criterion is not yet reached the corrected image and the reduced image data are added and a new correction cycle is run with the corrected image data thus obtained.

Figure 3:
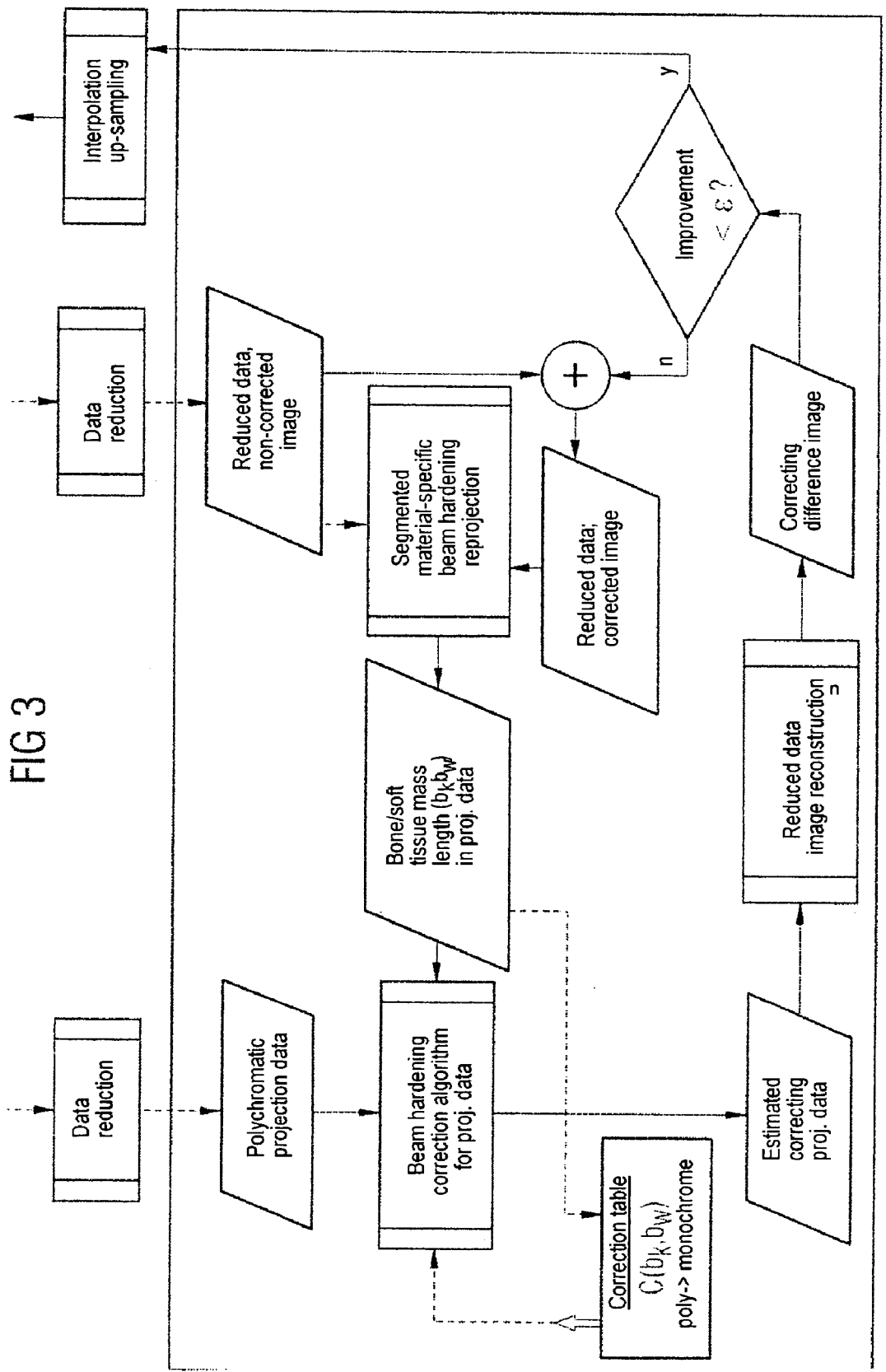
FIG. 3 a second example for an iteration process for computing a correction image.

FIG. 3 shows an example for the computation of the correction image for beam hardening correction. The radiation of x-ray tubes is polychromatic. When the x-rays penetrate the patient, depending on the path length, the lower-energy photons are more or less heavily filtered out so that a path length-dependent beam hardening, i.e. a dominance of photons of higher energy in the spectrum results. The effect of the beam hardening is increased even more by materials of higher orders of magnitude, in particular in bones, but also in metals in implants. The beam hardening is not taken into account in the standard reconstruction method used for image reconstruction. This method requires monochromatic x-rays. The image artifacts thus produced can be reduced or avoided by the present post-reconstructive correction.

With the correction, as can be seen from a FIG. 3, soft tissue and bones and/or metal are initially segmented by means of the threshold criteria from the reduced image data. The segmented image data are subjected to re-projection in which for each individual measurement beam values for the occupancy thickness $b_1$ (density*path length in g/cm$^2$) of the different segmented and materials along with the measurement ray through the object volume are produced. In the present example the embodiments are limited, without restricting the generality, for simplification purposes to two materials with occupancy thicknesses $b_W$ and $b_K$. The pair of values ($b_W$, $b_K$) will then be assigned by reference back to a correction table, in general by interpolation, a correction factor for converting polychromatic projection data which is disturbed by the hardening effect into monochromatic projection data. The two-parameter correction table C, which is broken down into discrete steps as regards $b_W$ and $b_K$, can be computed in advance offline in the following way or possibly also determined with measurements or adapted:

$$C(b_W, b_K) = F_{mono}/F_{poly}$$

In this case $F_{mono}$ or $F_{poly}$ are the logarithmatized or polochromatized CT projection value, defined by:

$$F_{mono}(b_W, b_K) = b_W \cdot \alpha_W(E_0) + b_K \cdot \alpha_K(E_0)$$

$$F_{poly}(b_W, b_K) = -\log\left(\int_0^{Emax} \exp(-b_W \cdot \alpha_W(E) - b_K \cdot \alpha_K(E)) dS(E)\right)$$

where dS(E) is the spectral dependence—including emission spectrum, prefiltering, spectral detector sensitivity—standardized to $\int dS(E)=1$, $\alpha(E)=\mu(E)/\rho$ the energy-dependent mass-attenuation coefficient ($\rho$=density), $E_{max}$ the maximum photon energy of the spectrum (determined by the tube voltage) and $E_0$ is the reference energy for conversion to monochromatic radiation.

The hardening correction of the polychromatically measured projection data $p^\sim$ is undertaken according to the formula:

$$p^{corrected} = p^\sim + \delta p$$

with the corrected projection data $$\delta p = (C(b_W, b_K) - 1) \cdot p^\sim.$$

A significant feature of the present correction method lies in the fact that only this corrected projection data $\delta p$ is subjected to volume or image reconstruction in order to compute a correction image and only after overlaying the uncorrected image additively. In this case essentially the linearity of the image reconstruction is utilized. As a rule $p^\sim$ are not corrected in one step. Instead what is known as water correction is frequently inserted which corrects the hardening as if the entire attenuation were based on a water-like material. In the formula for $F_{poly}$, $\alpha_K(E)$ is replaced in this case by $\alpha_W(E)$. The function produced $F_0(b)=F_{poly}(b,0)$ is directly invertible so that no reprojection is necessary. In a last step only the deviation between $F_{poly}(b_W, b_K)$ and $F_0(b_W+b_K)$ is then corrected, for which the segmented reprojection is then required however. More details can be found in the publication by P. Joseph et al. mentioned at the start.

Figure 4:
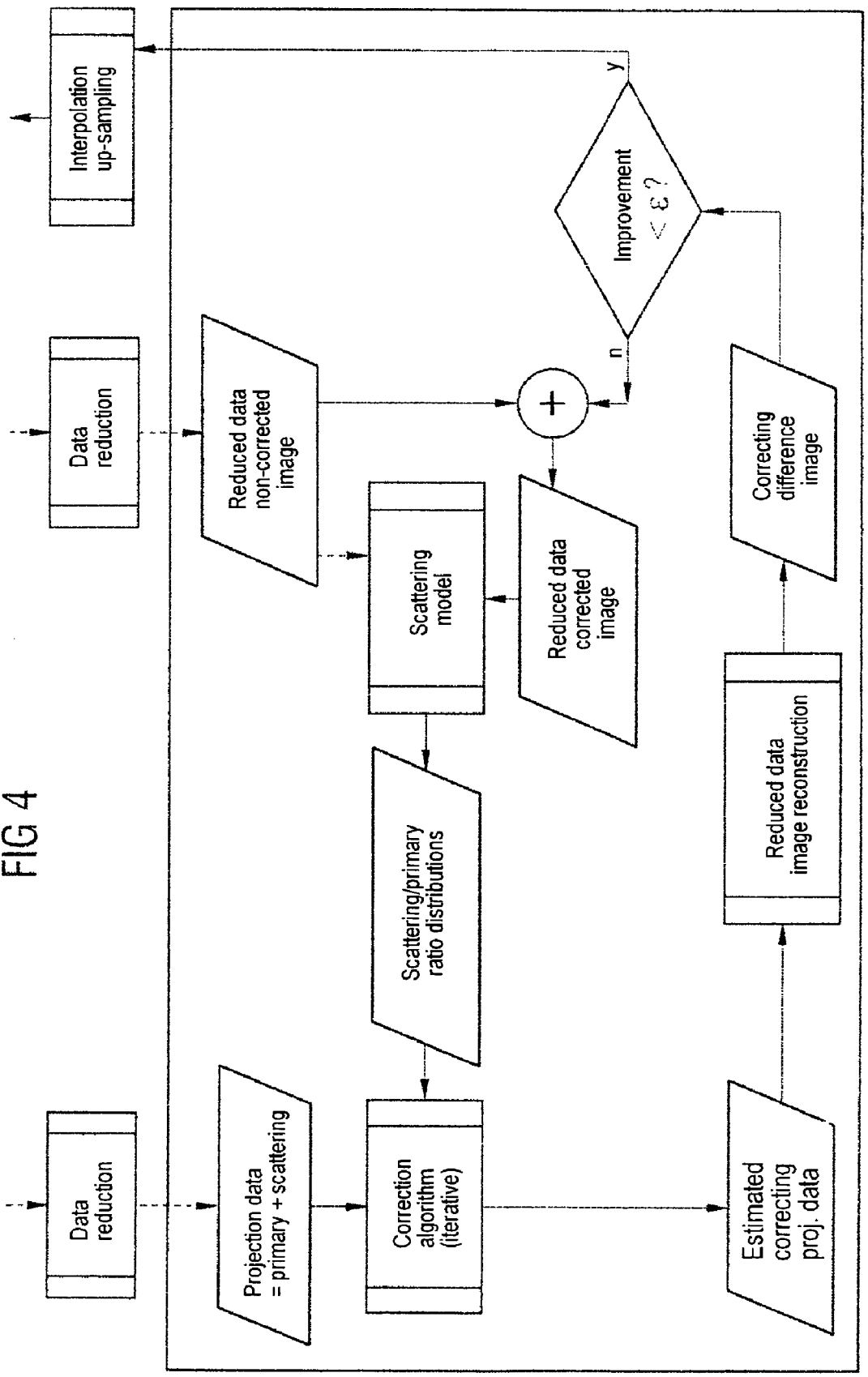
FIG. 4 a third example for an iteration process for computing a correction image.

FIG. 4 shows an example for x-ray scattering correction with the present method. For the theory of the reconstruction algorithms the attenuation coefficient in accordance with Beer's law is treated as an absorption coefficient. In actual fact the x-ray photons also interact however on passing through the matter in the form of scattering processes through coherent elastic scattering and incoherent Compton scattering. The x-ray scattering leads to a lower frequency background in the spatial Fourier spectrum of the primary radiation which is mainly imaging and corresponds to Beer's law. The x-ray scattering increases with the radiated volume and in 3D-CT imaging with flat detectors in particular plays a significant role. The x-ray scattering generated can in this case reach the order of magnitude of the unscattered primary radiation and in extreme cases even exceed it. The consequence is on the one hand a significant deterioration of the quantitative tissue density reconstruction, on the other hand additional artifacts are produced which can lead to incorrect diagnoses.

When the present method is used the reprojection is performed based on the reduced image data with a specific x-ray scattering model and the x-ray scattering distribution is estimated from this. Correction projection data can be computed from this estimation, which in its turn is reconstructed into a corrected image (FIG. 4). The iteration process here is performed as already explained in connection with FIG. 1. The scatter distribution is computed for a reduced number of projections and is used as a basis for the reconstruction of the corrected image.

Figure 5C:
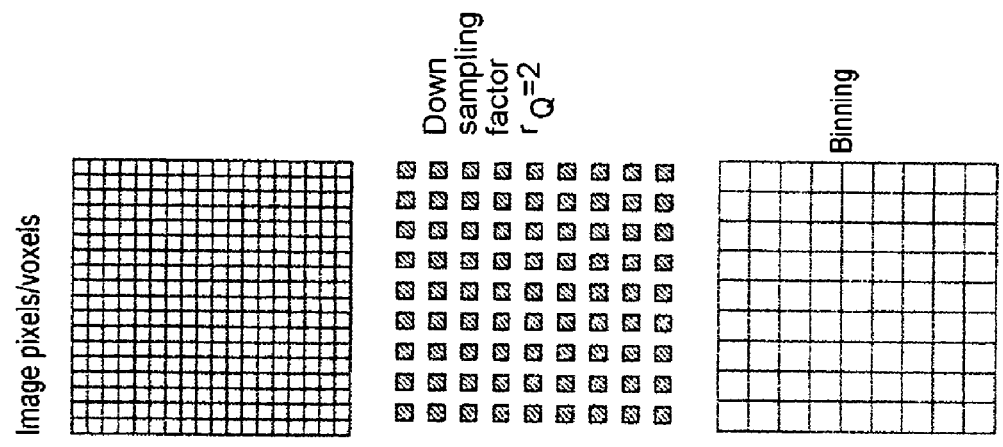
FIG. 5 examples of data reduction for obtaining the initial data for computing the correction image.
Figure 5B:
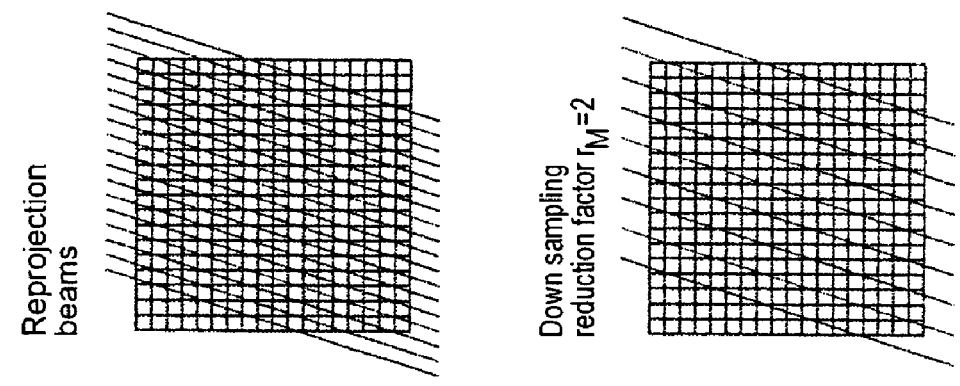
Figure 5A:
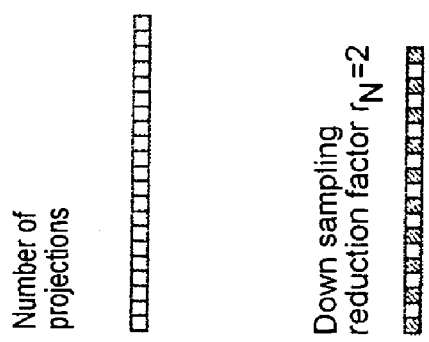

FIG. 5 finally shows different options for reduction of the projection or image data for computation of the corrected image in accordance with the present invention. A simple measure is the reduction in the number of projections, as illustrated in FIG. 5a. In this case down-sampling allows a reduction factor $r_N \geq 2$ to be achieved. In the lower part of FIG. 5a a reduction factor $r_N=4$ is assumed, with the four options shown representing the choice of projections. The computation effort for the physical reprojection and for the image reconstruction of the correction data decreases conversely in proportion to the reduction factor. By reducing the number of projections to a quarter the additional computation effort for a correction cycle which comprises the reprojection and the reconstruction would be approximately as large as a further standard reconstruction without correction.

More effective is the combination of the reduction in the number of projections and the reduction of the spatial resolution. There are two options for this reduction which are illustrated in FIGS. 5b and 5c. FIG. 5b here shows a reduction in the data on sampling with the sampling interval a of the projection data through down-sampling by the factor $r_M=2$. In this case the reprojection is undertaken in each case with the increased sampling interval. FIG. 5c shows a reduction in the image data for a pixel or voxel size v in the reconstructed image or volume. As a rule v≈a is chosen. However it is also possible to chose v<a in order for example to achieve greater precision in the reprojection of individual measurement rays. The computing effort for the back projection behaves in proportion to $v^{-3}$, of that for the reprojection such as $a^{-2} \cdot v^{-1}$ (for a 3D image) or as $v^{-2}$ or $a^{-1} \cdot v^{-1}$ for a 2D image. The data reduction can be undertaken in the case of the image data by decimation (down-sampling), in which case for example only every second pixel or voxel value is used (middle part of FIG. 5c). A further option is what is referred to as binning, i.e. grouping together or a number of adjacent pixels or voxels into an average value. This is illustrated in the lower part of FIG. 5c.

The reduction in the computing effort depending on the data reduction is then estimated with reference to 3D image data. To make matters simpler the reconstructed images are assumed to be quadratic with $M^2$ pixels (M~1/a) and the reconstruction volume to be cubic with $Q^3$ voxel (Q~1/v). The number of projections is taken to be N, the reduction factors are taken to be $r_M$, $r_Q$ or $r_N \geq 1$. The computing effort for the back projection including data reduction behaves in proportion to $(N/r_N)(Q/r_Q)^3$ and for reprojection in proportion to $(N/r_N)(Q/r_Q)(M/r_M)^2 K$, with the factor K taking account of the additional effort for the physical reprojection in comparison to the back projection. Let the number of iteration cycles of the correction algorithms be J. If the effort for the iterative correction algorithm is to be less than that for a standard reconstruction, the following conditions must apply:

$$((N/r_N)(Q/r_Q)^3 + (N/r_N)(Q/r_Q)(M/r_M)^2 K)J < NQ^3$$

$$1 + K(r_Q/r_M)^2(M/Q)^2 < r_N r_Q^3 / J$$

for $(M/Q) \approx 1$: $(1 + K(r_Q/r_M)^2) J < r_N r_Q^3$.

With the same reduction factors $r_Q = r_M = r_N$ the condition is:

$$(1+K)J < r_Q^4.$$

For beam hardening correction a bone and a soft tissue image can be generated for segmentation with two materials (soft tissue, bones) and two separate reprojections can be performed. If under unfavorable circumstances it is assumed that a single reprojection takes double the effort of a back projection, then K is $\leq 4$. Further J should be assumed to be $\leq 2$ since as a rule the method only operates with one iteration. The left-hand side of the last equation is then $\leq 10$ and the inequality can be fulfilled with a reduction in resolution by the factor $r_Q=2$. The additional computing time for the correction would be appr. $\leq 60\%$ for two iterations and $\leq 30\%$ for one iteration. With a reduction factor of $r_Q=3$ the additional computing time only amounts to appr. $\leq 12\%$ or $\leq 6\%$.

For an x-ray scattering correction the resolution can be reduced more than for hardening correction. On the other hand the effort for the specific segmented reprojection is greater than for the hardening correction. Assuming K=10, J=4, $r_N = r_M = r_Q = 4$ the additional effort for x-ray scattering correction only amounts for example to appr. 17% of the effort for the standard reconstruction.

The data reduction means that a large part of the measurement data is not needed at all for the correction. The choice of the subset of the data for the reduction is however subject to a certain arbitrariness. In application cases for which the correction of a number of iteration cycles is required, the data ignored for the previous iteration cycle in each case can however be used for the current iteration cycle to use the information contained within it and thereby to increase the accuracy of the correction without increasing the computing effort. This is illustrated with reference to FIG. 5a in the lower part in which data reduction by a factor of 4 takes place. The extracted projections can in this case represent the 1st, 5th, 9th projections for the first iteration etc. For the next iteration the projections with the numbers 3, 7, 11 etc., for the third iteration the projections with the numbers 2, 6, 10 etc. for the fourth Iteration the numbers 4, 8, 12 etc., for the fifth iteration the numbers 1, 5, 9 etc. are used again until the abort criterion is reached. This dovetailed sampling scheme can also be used for sampling in the reprojection or for sampling of the pixels or voxels of the image data, as is illustrated in FIG. 5c through a dovetailed sampling frame change. Naturally there are different possible variations for this which the person skilled in the art can easily recognize.

The present method can be used with any computer tomography devices, for example with devices of the third and fourth generation, with single-line or multiline detectors, for spiral CT, for CT with flat detectors, for CT with C arms and x-ray image amplifiers or also for mobile C-arm CT with x-ray image amplifiers of flat detectors.

The invention claimed is:

1. A method for correcting images recorded by a computer tomograph, comprising:
    reconstructing a 2D or a 3D image based upon projection data of images recorded by a computer tomograph; and
    correcting the 2D or 3D image by adding a correction image to the 2D or 3D image, wherein
    the correction image is computed by an iteration from a subset of the 2D or 3D image having a lower resolution and a less data compared to the 2D or 3D image and a subset of the projection data having a lower resolution and a less data compared to the projection data,
    the iteration is terminated until a difference between two successive correction images from two successive iteration steps is less than a predefined degree, and
    at least two different iterations are computed from two different subsets of the 2D or 3D image and two different subsets of the projection data.

2. The method in accordance with claim 1, wherein the correction image is computed based on
    reprojecting the subset of the 2D or 3D image,
    determining a corrected projection data based on the reprojection and the subset of the projection data, and
    reconstructing the correction image based on the corrected projection data.

3. The method in accordance with claim 1, wherein the lower resolution of the subset of the 2D or 3D image or the lower resolution of the subset of the projection data is achieved by reducing a spatial resolution or a gray value resolution of the 2D or 3D image or the projection data.

4. The method in accordance with claim 1, wherein the different subsets of the 2D or 3D image or the different subsets of the projection data are offset relative to each other in scanning grids.

5. The method in accordance with claim 1, wherein the correction image is computed for an x-ray scattering correction or a beam hardening correction.

6. The method in accordance with claim 1, wherein the lower resolution and the less data of the subset of the 2D or 3D image is achieved by binning.

7. The method in accordance with claim 1, wherein the lower resolution and the less data of the subset of the 2D or 3D image is achieved by decimation.

8. The method in accordance with claim 1, wherein the lower resolution and the less data of the subset of the projection data is achieved by selecting only some of the projection data.

* * * * *